(12) United States Patent
Katagiri

(10) Patent No.: US 7,204,624 B2
(45) Date of Patent: Apr. 17, 2007

(54) HEADLAMP FOR A TWO-WHEELED VEHICLE

(75) Inventor: Kiyoshi Katagiri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 96 days.

(21) Appl. No.: 10/963,428

(22) Filed: Oct. 11, 2004

(65) Prior Publication Data

US 2005/0122729 A1    Jun. 9, 2005

(30) Foreign Application Priority Data

Oct. 14, 2003    (JP)    ............... 2003-354253

(51) Int. Cl.
*B62J 6/02* (2006.01)
(52) U.S. Cl. .................... 362/475; 362/473
(58) Field of Classification Search ............. 362/475, 362/473, 476, 511, 545, 546; D12/107–127; D26/28

See application file for complete search history.

(56) References Cited

U.S. PATENT DOCUMENTS 6,390,656 B1 *  5/2002  Suda et al. ................ 362/475

6,957,903 B2 * 10/2005  Arakawa et al. ............ 362/545

FOREIGN PATENT DOCUMENTS

JP        07117748 A        5/1995

* cited by examiner

*Primary Examiner*—Alan Cariaso
*Assistant Examiner*—Leah S. Lovell
(74) *Attorney, Agent, or Firm*—Carrier, Blackman & Associates, P.C.; William D. Blackman; Joseph P. Carrier

(57) ABSTRACT

A headlamp of a two-wheeled vehicle is provided which improves visibility, increases flexibility in design of a vehicle body cover to be mounted at the front of the vehicle by the shape of the headlamp, and gives a novel impression. Specifically, in a two-wheeled vehicle including a leg shield at the front of the vehicle and a headlamp on the leg shield, the headlamp includes an elongated portion extending in a lateral direction and portions extending in a vertical direction from the left and right ends of the lateral portion.

7 Claims, 14 Drawing Sheets

HEADLAMP FOR A TWO-WHEELED VEHICLE

CROSS-REFERENCE TO RELATED APPLICATIONS

The present invention claims priority under 35 USC 119 based on Japanese patent application No. 2003-354253, filed Oct. 14, 2003.

BACKGROUND OF THE INVENTION

1. Field of the Invention

The present invention relates to a headlamp for a two-wheeled vehicle. More particularly, the present invention relates to headlamp for a motorcycle or similar vehicle.

2. Description of the Background Art

A headlamp for a two-wheeled vehicle is known which is provided on a front cowl. A headlamp for a two-wheeled vehicle of this type is disclosed, for example, in Japanese Patent No. 3343698.

FIG. 17, which corresponds to FIG. 6 of Japanese Patent No. 3343698 except the parts have been renumbered, is a front view showing a headlamp 302 for a two-wheeled vehicle in the related art. There is shown a two-wheeled vehicle in which a front portion of a vehicle body is covered by a front cowl 301 from the front of the vehicle body to the side of the vehicle body, and a headlamp 302 having an inverted trapezoidal shape is provided at the face of the front cowl 301. Further, an outside air introducing port 304 is also located at the face of the front cowl 301 and underneath the headlamp 302. A front wheel 303 is located underneath the outside air introducing port 304, such that the outside air introducing port 304 extends across a front wheel 303.

When operating the two-wheeled vehicle, the headlamp 302 is turned on for drawing the attention of other vehicles or pedestrians when travelling during the daytime as well as during the night time. Therefore, by improving the visibility of the headlamp 302, the efficiency of the headlamp 302 to draw other people's attention would also be improved.

In order to improve cooling performance, it is better to provide the outside air introducing port 304 below the front cowl 301, which allows traveling wind to blow onto an engine, a radiator, or the like. Further, it is better to arrange the headlamp 302 above the front cowl 301 in order to illuminate the front side of the vehicle. In this manner, the shape of the front cowl 301 is limited due to the aforementioned headlamp 302, the outside air introducing port 304, and the like.

In addition, the headlamp 302 is an important element for determining a design of the front portion of the two-wheeled vehicle, and hence it is desired to have a shape which gives a novel impression.

SUMMARY OF THE INVENTION

It is an object of the present invention to provide a headlamp for a two-wheeled vehicle which increases flexibility in the design of a vehicle body cover provided on the front portion of the vehicle while increasing visibility of the headlamp. The flexibility in the design is achieved through the shape of the headlamp, thus also giving a novel impression.

According to a first aspect of the present invention a two-wheeled vehicle is provided with a vehicle body cover at the front of the vehicle and a headlamp mounted to the vehicle body cover, wherein the headlamp includes and elongated portion extending in the lateral direction of the vehicle and portions extending downwardly from both ends of the laterally extending portion.

In the related art, a vehicle body cover is shaped in such a manner that will support a round or a rectangle headlamp. However, according to the first aspect of the present invention, the shape of the vehicle body cover employed is such that a headlamp is provided with a laterally extending segment which has segments extending vertically in a downward direction from each end of the laterally extending segment. Using this design for a headlamp will improve visibility of the headlamp by another vehicle or a pedestrian. In addition, the laterally extending portion and the downwardly extending portions give a novel impression as a headlamp. A shape for a vehicle body cover which may incorporate such a headlamp may include, for example, a vehicle body cover having an air intake port between the left and right downwardly extending portions of a headlamp.

Further, according to a second aspect of the present invention, a headlamp may be formed substantially into the shape of a letter H by extending portions in both an upward and a downward direction from both the ends of the laterally extending portion. This design will also improve the visibility of a headlamp by another vehicle or a pedestrian. The headlamp formed into the substantially H-shape also gives a favorable and novel impression.

According to a third aspect of the present invention, a headlamp may be formed such that the vehicle body cover is formed into an angular C-shape. With such vehicle body cover, the front surface of the vehicle body cover, above the bent portion of the angular C-shape, may be formed by an upper inclined section, the laterally elongated portion of the headlamp may be arranged on the upper inclined section of the angular C-shape and be allocated to be a portion for emitting a low beam, and the upward and downward vertically extending portions of the headlamp may be allocated to be portions for emitting high beams. By arranging the laterally extending portion in such a manner, the irradiating property from the laterally extending portion is improved.

According to a fourth aspect of the present invention, a headlamp may further include a vehicle body cover where the front surface below the bent section of the angular C-shape is formed by a lower inclined section, and the downward vertically extending portions of the headlamp may be extended from the upper inclined section to the lower inclined section.

The downward vertically extending portions of the headlamp may be extended from the upper inclined section to the lower inclined section of the cover so that the irradiating property from the vertically elongated lower extending portion is improved.

According to a fifth aspect of the present invention, a headlamp may be disposed along the edge of an opening provided on the front portion of the vehicle body cover having the same shape and size as the headlamp. Since the headlamp is formed along the edge of the opening provided at the front of the vehicle body cover, the shape and the size of the opening can hardly be limited in comparison with the case in which a round or square headlamp is disposed at the front of the vehicle, whereby the area of the opening can be increased, thereby improving cooling capability of the engine.

According to a sixth aspect of the present invention, a headlamp may comprise one or more LEDs as the main light emitting source, and may be formed into an M-shape or into an H-shape in front view of the two wheeled vehicle. The headlamp formed using an LED(s) desirably reduces the power consumption of the headlamp. Also, the headlamp formed into the M-shape or into the H-shape, again, gives a novel impression in appearance.

With the first aspect of the present invention, since the headlamp includes an elongated segment extending in a lateral direction and segments extending in a downward direction from both ends of the portion extending in a lateral direction, visibility of the headlamp especially during the daytime can be improved so as to more efficiently draw attention of other vehicles and pedestrians.

Moreover, since the shape of the vehicle body cover is different from the case in which a round or rectangular headlamp is used, because of the unique shape of the headlamp of the present invention, a vehicle body cover having an air intake port between the left and right segments of the headlamp which extend in a downward direction may be formed, reflecting that flexibility in design of the vehicle body cover is improved. In addition, since the headlamp includes segments extending both laterally and vertically, it can give a novel impression as a headlamp, whereby the commercial property of the two-wheeled vehicle can be improved.

With the second aspect of the present invention, the headlamp is formed into an H-shape by being vertically extended at opposite ends of the lateral portion both upwardly and downwardly. This design also gives a novel impression as the headlamp, whereby the commercial property of the two-wheeled vehicle can be improved.

With the third aspect of the present invention, the vehicle body cover is formed into an angular C-shape and positioned in such a way that the C-shape is apparent from the side view, the front surface of the vehicle body cover above the bent section of the angular C-shape is formed by an upper inclined section, the laterally extending portion of the headlamp is arranged on the upper inclined section, the portion extending in a lateral direction is allocated to be a portion for emitting a low beam and the headlamp portions extending in a vertical direction are allocated to be portions for emitting high beams. Therefore, the irradiating property from the portion extending in a lateral direction is improved, and hence the road surface can be illuminated more brightly.

With the fourth aspect of the present invention, the front surface of the vehicle body cover below the bent section of the angular C-shape is formed by the lower inclined section, and the headlamp portions extending vertically in a downward direction are extended from the upper inclined section to the lower inclined section. Further, a light beam is emitted from the vertically elongated portions which are extended upward and downward, thereby improving the irradiating property of the headlamp.

With the fifth aspect of the present invention, since the headlamp is formed along the edge of the opening provided at the front of the vehicle body cover, the shape and the size of the opening is hardly limited in comparison with the case in which a round or square headlamp is disposed at the front of the vehicle, whereby the area of the opening can be increased, thereby improving cooling capability of the engine.

Also, since the shape or the size of the opening needed for a headlamp according to the present invention is not limited as much as is case in which a round or square headlamp is disposed at the front of the vehicle as in the background art, the area of the opening in which the headlamp is disposed in the vehicle cover can be increased, thereby improving the cooling capability of the engine.

With the sixth aspect of the present invention, the headlamp comprises one or more LEDs as the main light emitting source, and is formed into an M-shape or into an H-shape when looking at the front view of the two wheeled vehicle.

Since the headlamp is formed using LED(s) the power consumption of the headlamp is desirably reduced in comparison to conventional headlamps. Further, the headlamp formed into the M-shape or the H-shape gives a favorable novel impression in appearance.

Although the following disclosure offered for public dissemination is detailed to ensure adequacy and aid in understanding the invention, this is not intended to prejudice that purpose of a patent which is to cover each new inventive concept disclosed therein no matter how it may later be disguised by variations in form or additions of further improvements. The claims appended hereto are intended as the chief aid towards this purpose, as it is the claims which meet the requirement of pointing out the improvements and combinations in which the inventive concepts are found.

DETAILED DESCRIPTION OF THE INVENTION

Figure 1:
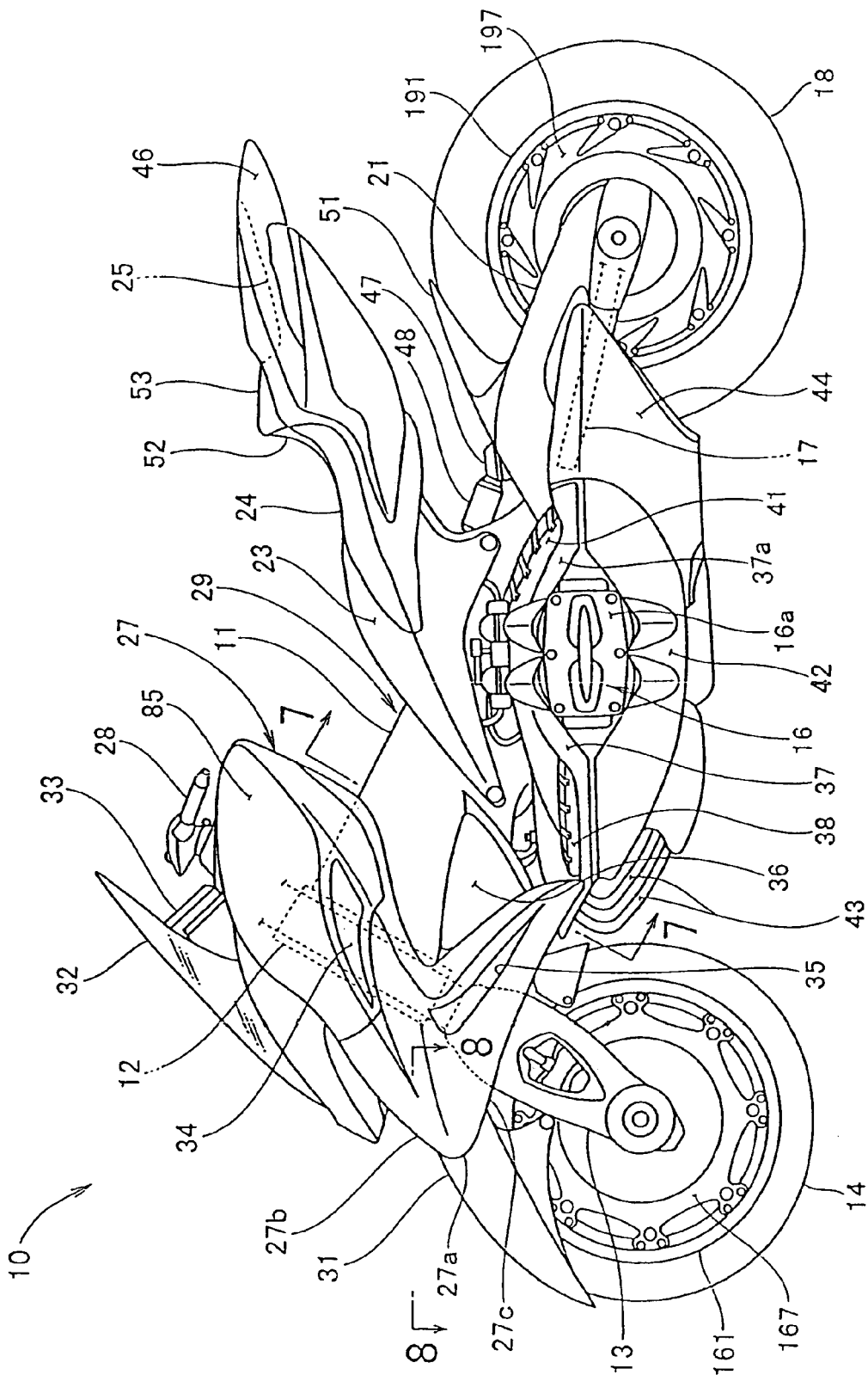
FIG. 1 is a side view of an embodiment of a two-wheeled vehicle according to the present invention.

Referring to the drawings, embodiments of the present invention will be described below.

FIG. 1 is a side view of a two-wheeled vehicle including a headlamp according to an embodiment of the present invention, wherein the two-wheeled vehicle 10 is a vehicle configured by mounting a head pipe 12 at the front of a monocoque frame 11 (the structure described in detail below), mounting the front suspension 13 steerably to the head pipe 12, with the front suspension 13 supporting a front wheel 14, mounting an engine 16, horizontally opposed, at the rear of the monocoque frame 11, connecting a transmission (not shown) at the rear of the engine 16, connecting a rear wheel 18 to the transmission via a drive shaft 17, mounting a swing arm 21 for supporting the rear wheel 18 at the rear of the monocoque frame 11 so as to be capable of a vertical swinging motion, mounting a rear frame 23 to the rear upper portion of the monocoque frame 11, providing a driver's seat 24, which a driver straddles while sitting, on the rear frame 23, a fellow passenger's seat 25, which is disposed at a position higher than and behind the driver's seat 24 and which a fellow passenger straddles while sitting, on the rear frame 23, providing a leg shield 27 in the form of a vehicle body cover, which is formed in a substantially angular C-shape when viewed from the side, in front of the driver's seat 24 and surrounding the front suspension 13, and providing a leg-straddling member 29, which is substantially U-shaped when viewed from the side, between a handle bar 28 and the driver's seat 24.

The monocoque frame 11 ("mono" of "monocoque" means a single, "coque" means a shell) is a frame not formed into a pipe frame but formed of a plate-shaped member for receiving a load. The monocoque frame 11 has a structure in which rigidity can be secured, and weight reduction is achieved.

Cylindrical members 16a (only the cylindrical member on near side is shown) project leftward and rightward from the engine 16. A front fender 31 covers the upper portion of the front wheel 14, reference numeral 32 designates a windscreen, reference numeral 33 designates a meter, reference numeral 34 designates turn signals as direction indicator lamps attached on both sides of the leg shield 27 (only the turn signal on the near side is shown), reference numeral 35 designates air outlet ports (only the air port on the near side is shown) for discharging air taken into the leg shield 27, reference numeral 36 designates a fuel tank disposed downwardly of the monocoque frame 11, reference numeral 37 designate a step panel for covering the upper side of the engine 16 (only the step panel on the near side is shown), reference numeral 38 designate driver's step attached to the front of the step panel 37 (only the driver's step on the near side is shown), for allowing the driver's feet to be placed, reference numeral 41 designates a fellow passenger's step attached to the rear portions (the curved portion 37a) of the step panel 37 for allowing the fellow passenger's feet to be placed, reference numeral 42 designates a step under panel disposed below the step panel 37 (only the step under panel on the near side is shown), for covering the lower side of the engine 16, reference numeral 43 designates exhaust pipes extending rearward from the front of the engine 16, reference numeral 44 designates a muffler connected to the rear portions of the exhaust pipes 43, reference numeral 46 designates fellow passenger's grips (only the passenger's grip on the near side is shown), reference numeral 47 designates a rear shock absorber unit for preventing transmission of an impact from the rear wheel 18 to the monocoque frame 11, reference numeral 48 designates a reservoir tank for allowing oil to flow into and out of the rear shock absorber unit 47, reference numeral 51 designates a rear fender attached to the upper portion of the swing arm 21 for covering the obliquely upper front of the rear wheel 18, reference numeral 52 designates a backrest for the driver extending upward from the rear portion of the driver's seat 24, and reference numeral 53 designates a protruded portion formed at the center of the top of the driver's backrest 52.

Figure 2:
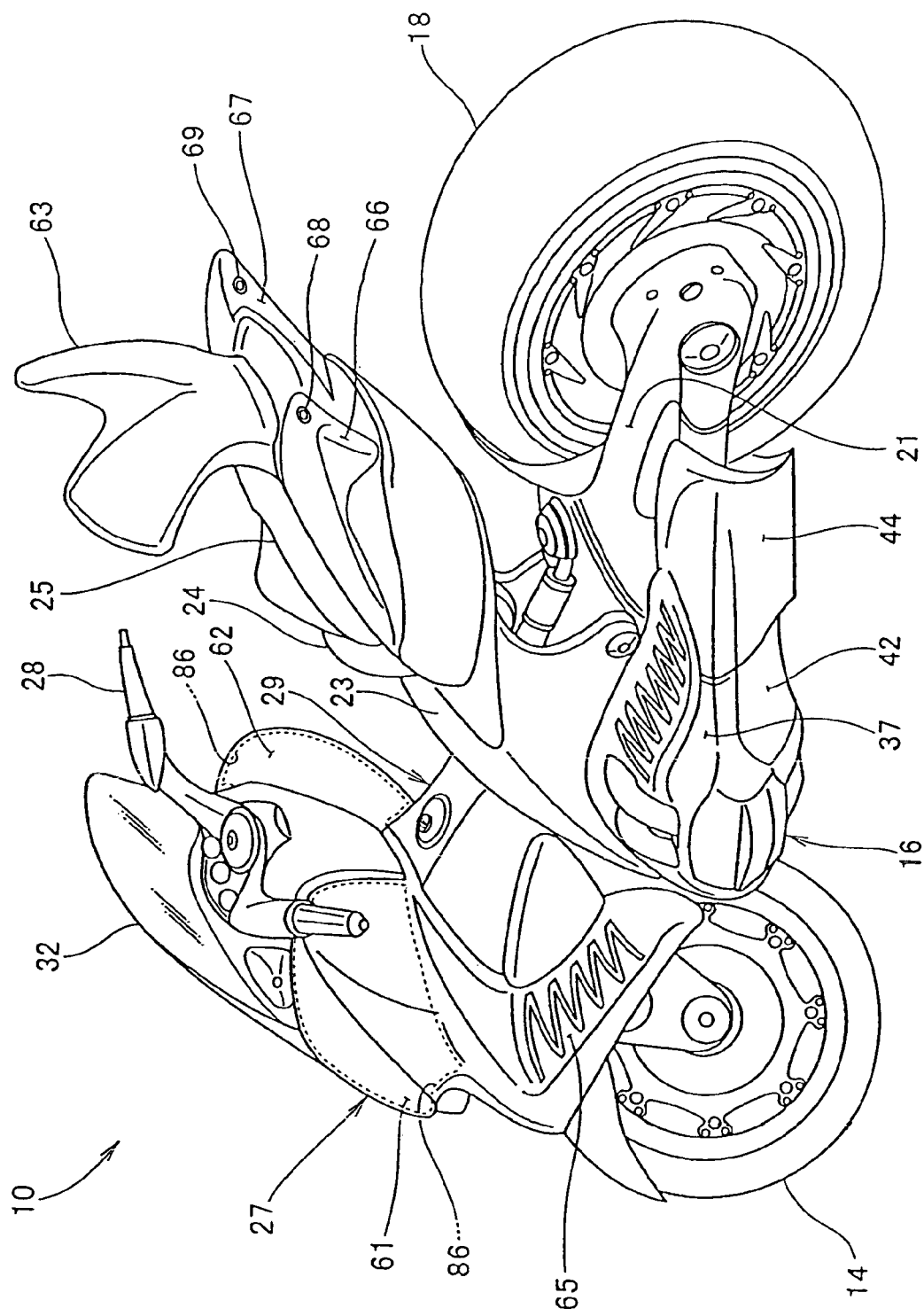
FIG. 2 is a perspective view of the two-wheeled vehicle in FIG. 1.

FIG. 2 is a perspective view of the two-wheeled vehicle including the headlamp according to the embodiment of the present invention, showing a state in which the leg shield 27 of the two-wheeled vehicle 10 includes a left shield member 61 and a right shield member 62, storage chambers 86 are provided on the upper portions of the left shield member 61 and the right shield member 62 for allowing a helmet to be stored, the fellow passenger's seat 25 of the two-wheeled vehicle 10 is covered by a rear cowl 63 on the upper side thereof, the rear cowl 63 is attached to the rear frame 23 so as to be capable of opening and closing, such that the rear cowl 63 functions as a backrest for placing the hip and the back of the fellow passenger while it is open or in an upright position. Reference numeral 65 designates front steps for allowing the driver to place his/her legs when they are stretched (only the front steps on the near side are shown), reference numerals 66, 67 designate left and right tail lamps, respectively, reference numerals 68, 69 designate rear motion picture cameras mounted to the rear portion of the left and right tail lamps 66, 67, respectively, so as to face rearward.

Figure 3:
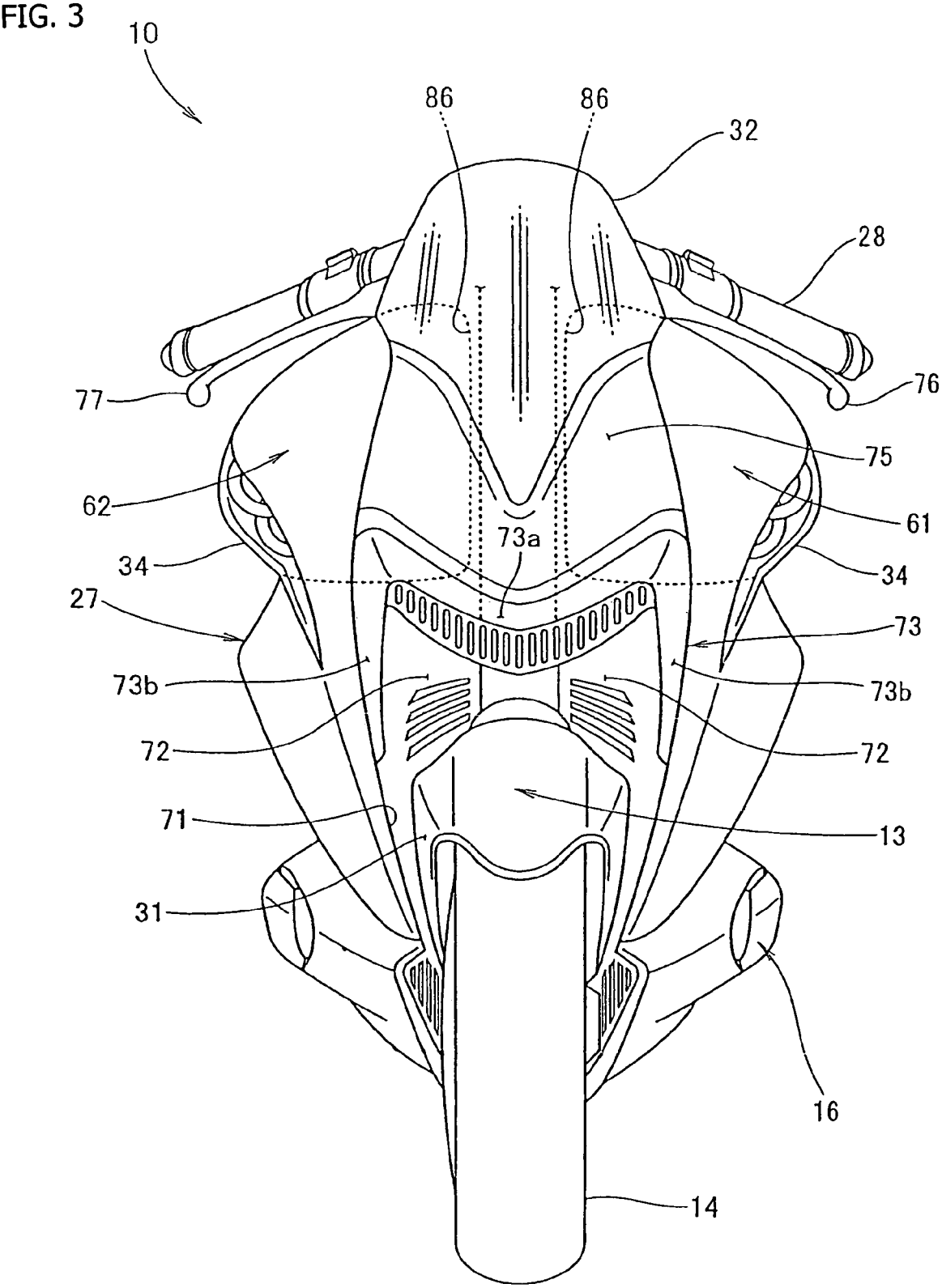
FIG. 3 is a front view of the two-wheeled vehicle in FIG. 1.

FIG. 3 is a front view of the two-wheeled vehicle including the headlamp according to the embodiment of the present invention, showing a state in which an air intake port 71 has an opening which is provided at the front of the leg shield 27 of the two-wheeled vehicle 10, the radiators 72 are disposed on the left and right sides in the air intake port 71, and a headlamp 73 including at least one LED (Light Emitting Diode) and formed into an M-shape and provided at the upper edge of the air intake port 71. Reference numeral 75 designates a front center cover, reference numeral 76 designates a clutch lever, and reference numeral 77 designates a front wheel brake lever.

The headlamp 73 includes a portion 73a extending laterally across vehicle, and portions 73b extending vertically in a downward direction from the left and right ends of the lateral portion 73a. The laterally extending portion 73a functions to emit a low beam, and the vertically extending portions 73b function to emit high beams. As seen in FIG. 3, the vertically extending portions 73b extend in a vertical direction to an extent which is greater than a vertical dimension of the lateral portion 73a. In FIG. 1, the front surface of the vehicle body cover above the bent portion 27a of the leg shield 27 is determined as an upper inclined section 27b, and front surface of the vehicle body cover below the bent portion 27a is determined as a lower inclined section 27c. The portion 73a, which extends in a lateral direction, is provided on the upper inclined section 27b and the portions 73b, which extend in a vertical direction, are provided from the upper inclined section 27b to the lower inclined section 27c. Most parts of the laterally extending portion 73a and the vertically extending portions 73b serve as light emitting portions.

Figure 4:
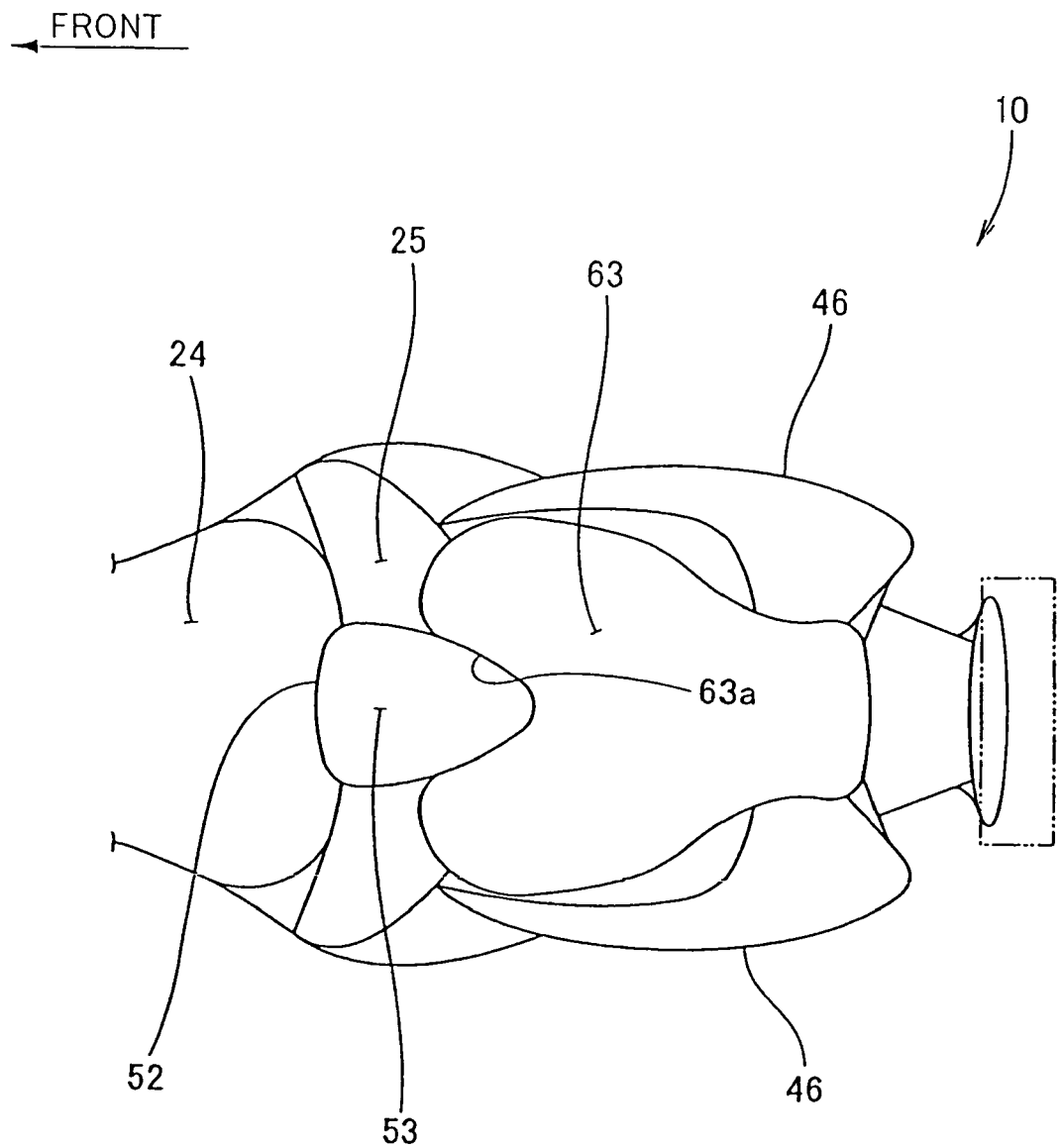
FIG. 4 is a plan view of a rear portion of the two-wheeled vehicle in FIG. 1.

FIG. 4 is a plan view of the rear portion of the two-wheeled vehicle including the headlamp according to the embodiment of the present invention (an arrow with the word "FRONT" in the drawing points in the direction of the front portion of the vehicle, hereinafter). A protrusion 53 extending in the upward direction is provided at the center of the front portion of the fellow passenger's seat 25 of the two-wheeled vehicle 10, a retracted portion 63a which is retracted to get around the protrusion 53 is provided at the front portion of the rear cowl 63, and fellow passenger's grips 46 are disposed on both sides of the rear cowl 63.

Figure 5:
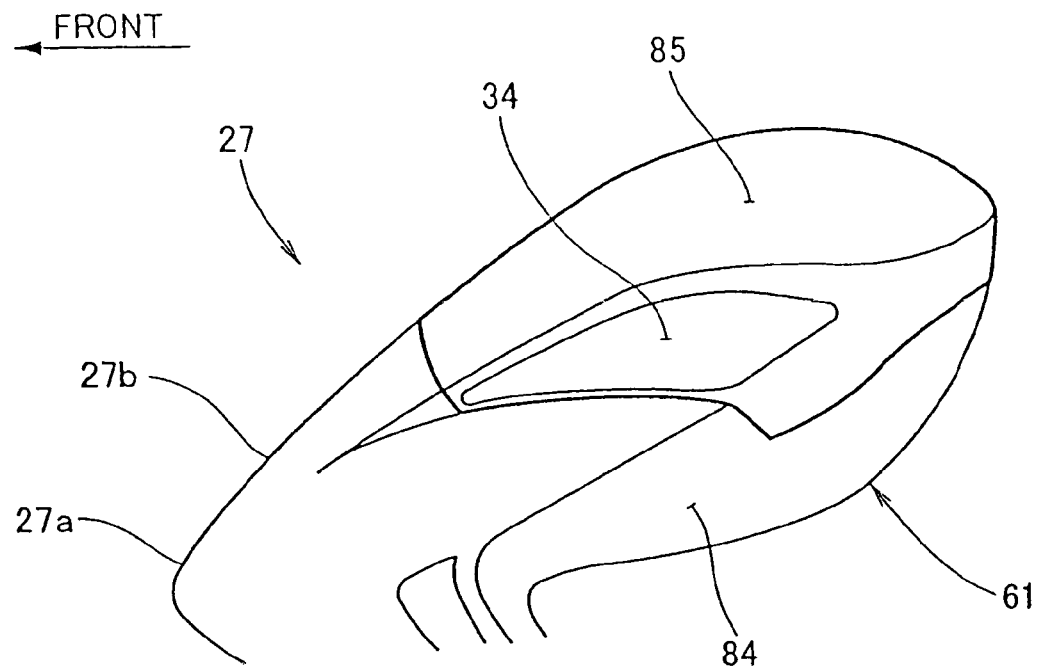
FIG. 5 is a side view showing a principal portion of a leg shield of the two-wheeled vehicle in FIG. 1.

FIG. 5 is a side view showing a principal portion of a leg shield of the two-wheeled vehicle including the headlamp according to the embodiment of the present invention. The left shield member 61 of the leg shield 27 includes a shield body 84 and a lid 85 attached to the side of the shield body 84 so as to be capable of opening and closing (the contour of the lid 85 is shown by a thick line), and the lid 85 is provided with a turn signal 34 on the side thereof. The right shield member 62 (see FIG. 2) is formed symmetrically to the left shield member 61 described above, and has the same basic structure.

Figure 6:
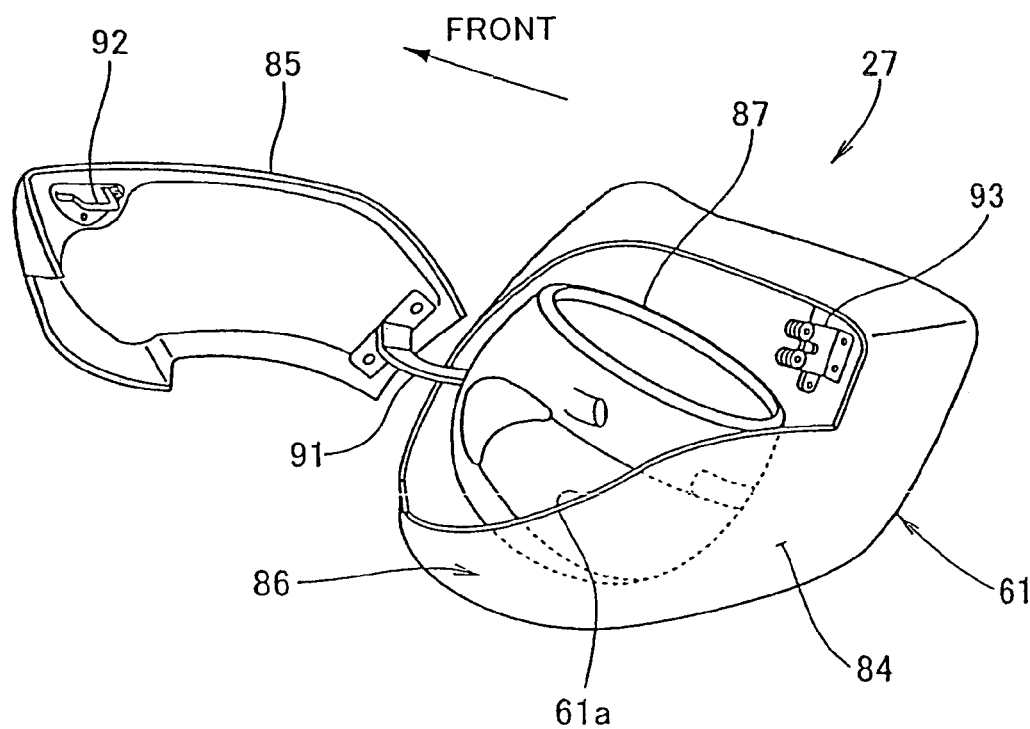
FIG. 6 is a perspective view showing the principal portion of the leg shield of the two-wheeled vehicle in FIG. 1.

FIG. 6 is a perspective view showing a principal portion of the leg shield of the two-wheeled vehicle including the headlamp according to the embodiment of the present invention. The lid 85 of the left shield member 61 of the leg shield 27 is opened toward the front of the vehicle body, and a helmet 87 is stored in the storage chamber 86 provided in the left shield member 61. Reference numeral 61a designates an opening of the left shield member 61.

The lid 85 is a member attached to the shield body 84 via a hinge 91 so as to be capable of opening and closing. The lid 85 can be closed by engaging a striker 92 attached to the inside of the lid 85 to the lock device 93 attached to the inside of the shield body 84, and the lid 85 can be opened by releasing engagement between the lock device 93 and the striker 92 by a lock releasing device, not shown.

Figure 7:
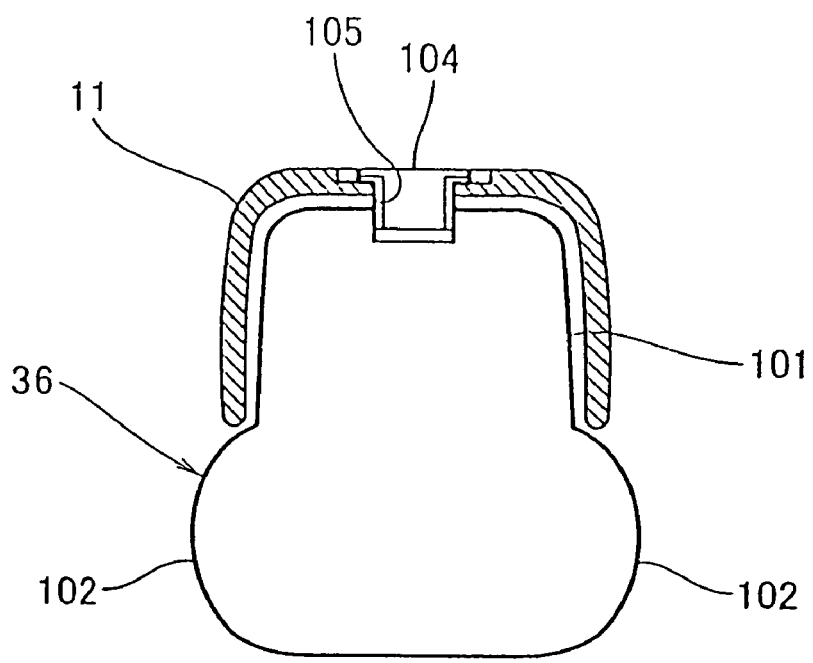
FIG. 7 is a cross-sectional view taken along the line 7—7 in FIG. 1.

FIG. 7 is a cross-sectional view taken along the line 7—7 in FIG. 1, showing that a fuel tank 36 is arranged below the monocoque frame 11 formed into an inverted angular U-shape with its opening facing downward, more specifically, a narrow portion 101 provided on the upper portion of the fuel tank 36 is disposed inside the monocoque frame 11, and the protruded portions 102 formed integrally with the thinned portion 101 of the fuel tank 36 are exposed outward from the monocoque frame 11. Reference numeral 104 designates a cap for closing a fuel supply port 105 of the fuel tank 36.

Figure 8:
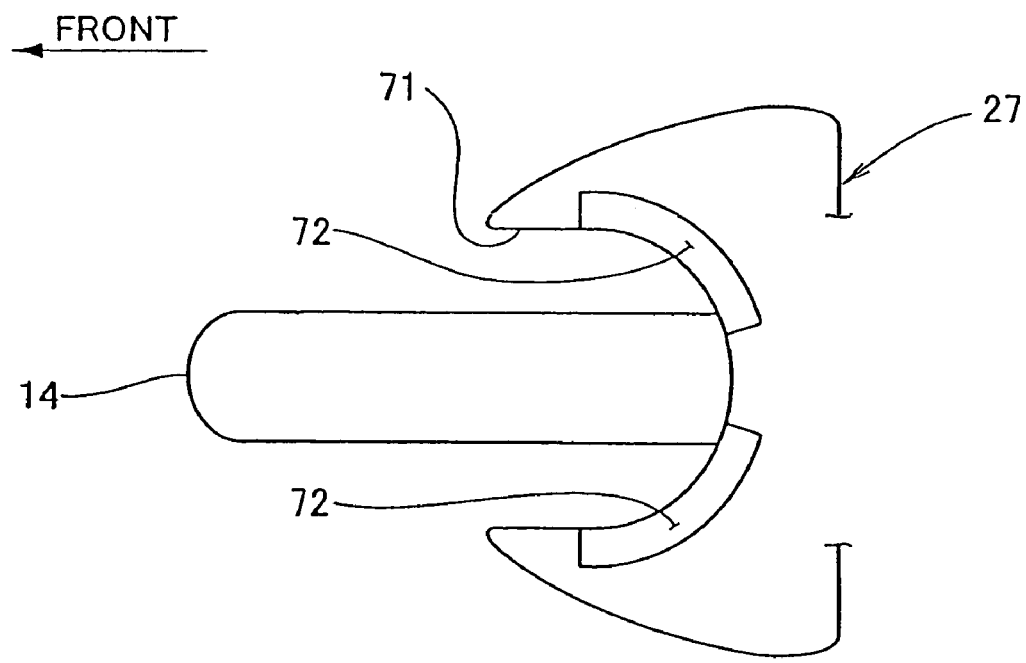
FIG. 8 is a cross-sectional view taken along the line 8—8 in FIG. 1.

FIG. 8 is a cross-sectional view taken along the line 8—8 in FIG. 1, showing the radiators 72 which are arranged inside the air intake port 71 of the leg shield 27.

The radiators 72 are formed substantially into an arcuate shape along the edge of the leg shield 27, so as to be disposed compactly in the leg shield 27.

Figure 9:
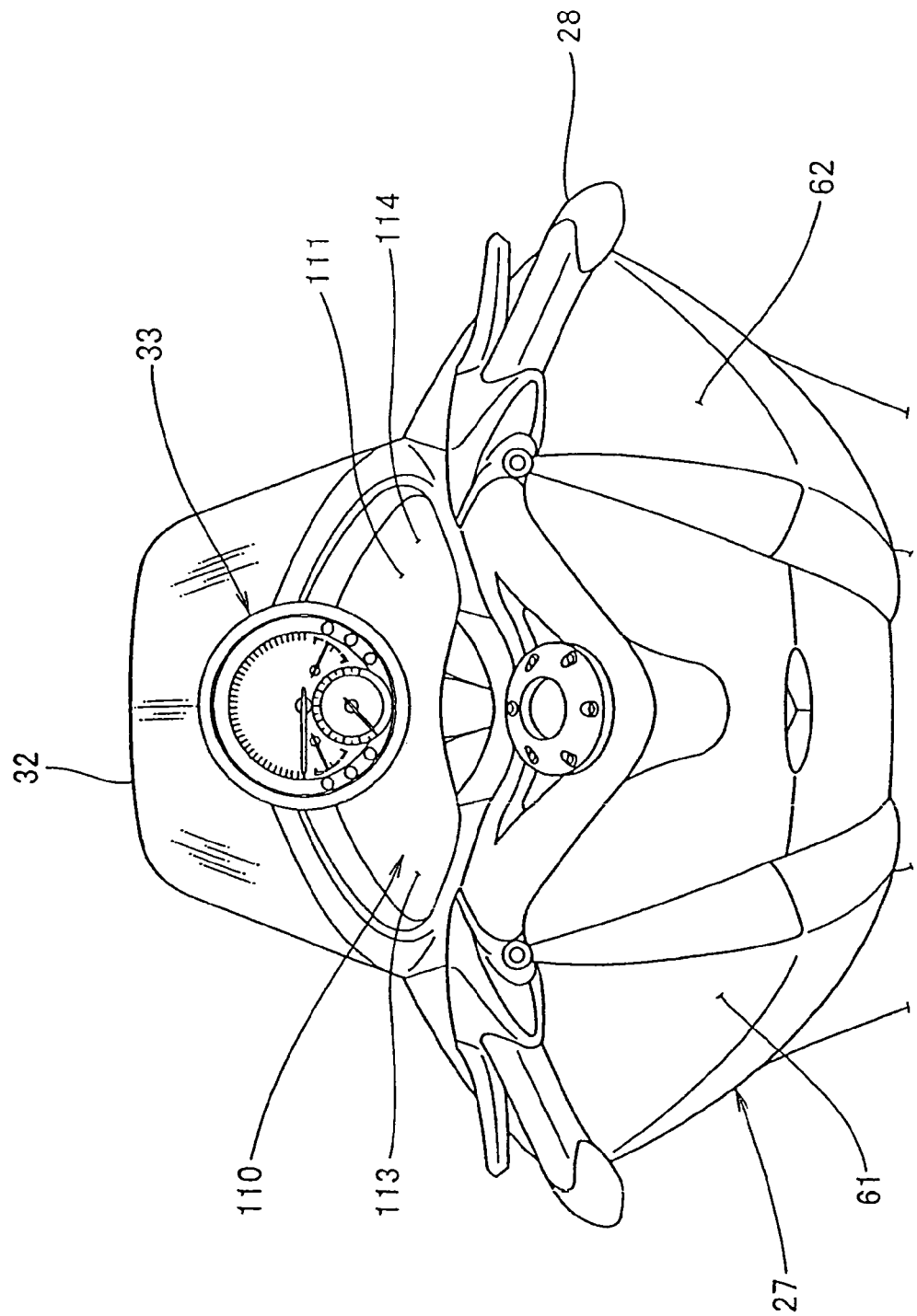
FIG. 9 is an explanatory drawing of a principal portion showing a display device of the two-wheeled vehicle in FIG. 1.

FIG. 9 is an explanatory drawing of a principal portion showing a display device of the two-wheeled vehicle including the headlamp according to the embodiment of the present invention. The display device 110 includes a display unit 111 for displaying characters and graphics, and a meter 33 arranged so as to overlap partly with the display unit 111.

The display unit 111 includes a left display unit 113 and a right display unit 114, and during traveling, for example, the rear views of the vehicle taken by the aforementioned rear motion picture cameras 68, 69 are displayed on the left display device 113 and the right display device 114, respectively, and, when the vehicle is stopped in idle, values of coolant temperature, lubricant temperature, hydraulic pressure of lubricant of the engine 16 (see FIG. 1) are displayed in digit or by bar graph, for example.

Figure 10:
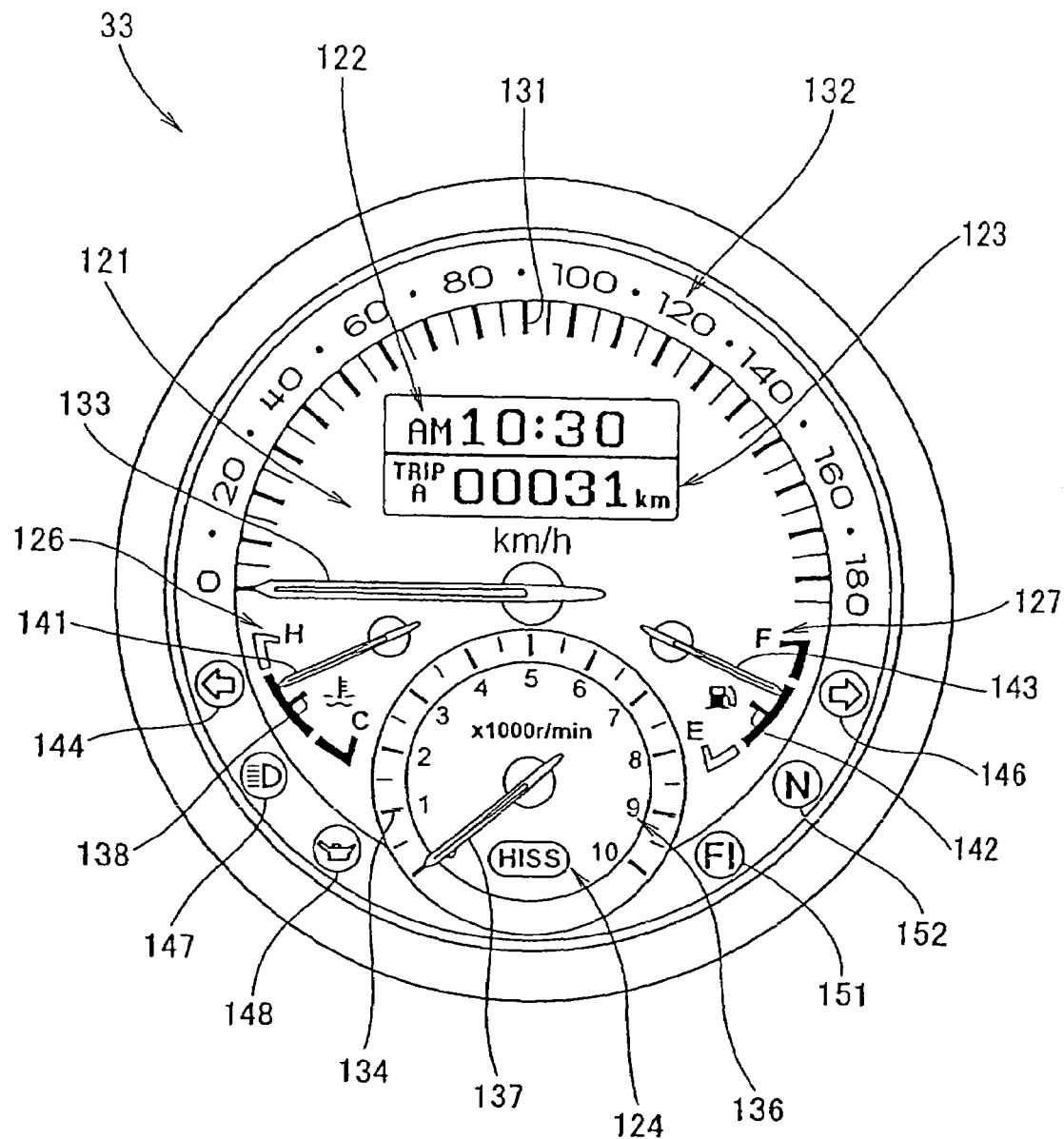
FIG. 10 is a front view of a meter of the two-wheeled vehicle in FIG. 1.

FIG. 10 is a front view of a meter 33 of the two-wheeled vehicle including the headlamp according to the embodiment of the present invention, in which the meter 33 includes a circular analogue speedometer 121, a digital clock 122 and a digital trip meter 123 provided on the upper portion in the speedometer 121, a circular analogue tachometer 124 having a smaller outer diameter than the speedometer 121 and disposed at a lower position inside if the speedometer 121, and an analogue coolant temperature gauge 126 and an analogue fuel amount indicator 127 disposed on the left side and the right side of the tachometer 124, respectively.

Here, reference numeral 131 designates a speed graduation of the speedometer 121, reference numeral 132 designates a speed indicating value of the speedometer 121, reference numeral 133 designates a pointer of the speedometer 121, reference numeral 134 designates a graduation of the number of revolution of the tachometer 124, reference numeral 136 designates an indicated value of the number of revolutions of the tachometer 124, reference numeral 137 designates a pointer of the tachometer 124, reference numerals 138 and 141 designate a temperature graduation and a pointer of the coolant temperature gauge 126, respectively, reference numerals 142 and 143 designate a fuel graduation and a pointer of the fuel amount indicator 127, respectively, reference numerals 144 and 146 designate display lamps for indicating the direction of indication of the turn signals 34 (see FIG. 1), respectively, reference numeral 147 designates a display lamp for displaying illumination of the high beam, reference numeral 148 designates a display lamp for indicating the lowering of the pressure of the engine lubricant or of the amount of the same, reference numeral 151 designates a display lamp for indicating the operating state of the fuel injection system, and reference numeral 152 designates a display lamp indicating the neutral position of a gear train in the transmission.

Figure 11:
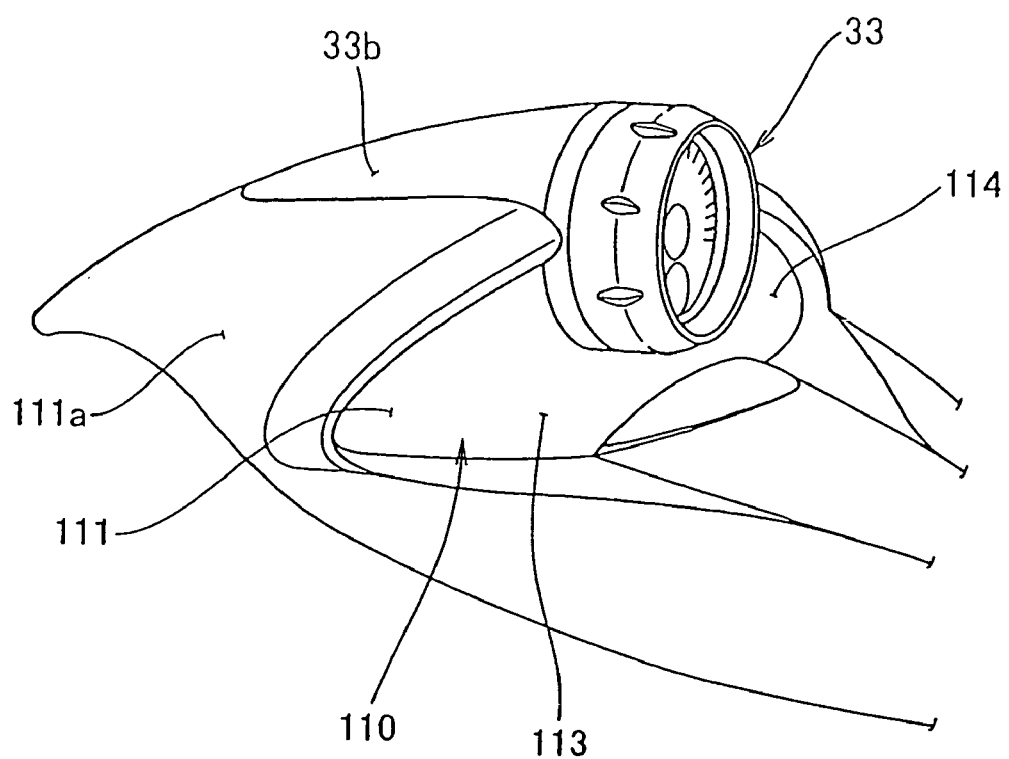
FIG. 11 is a first perspective view showing the display device of the two-wheeled vehicle in FIG. 1.

FIG. 11 is a first perspective view showing a display device of the two-wheeled vehicle including the headlamp according to the embodiment of the present invention showing that the display unit 111 and the meter 33 of the display device 110 are disposed so as to overlap with each other and that the meter 33 is projected toward the driver with respect to the display unit 111. Accordingly, the display device 110 can be formed three-dimensionally, and hence the display device 110 gives a powerful impression.

Figure 12:
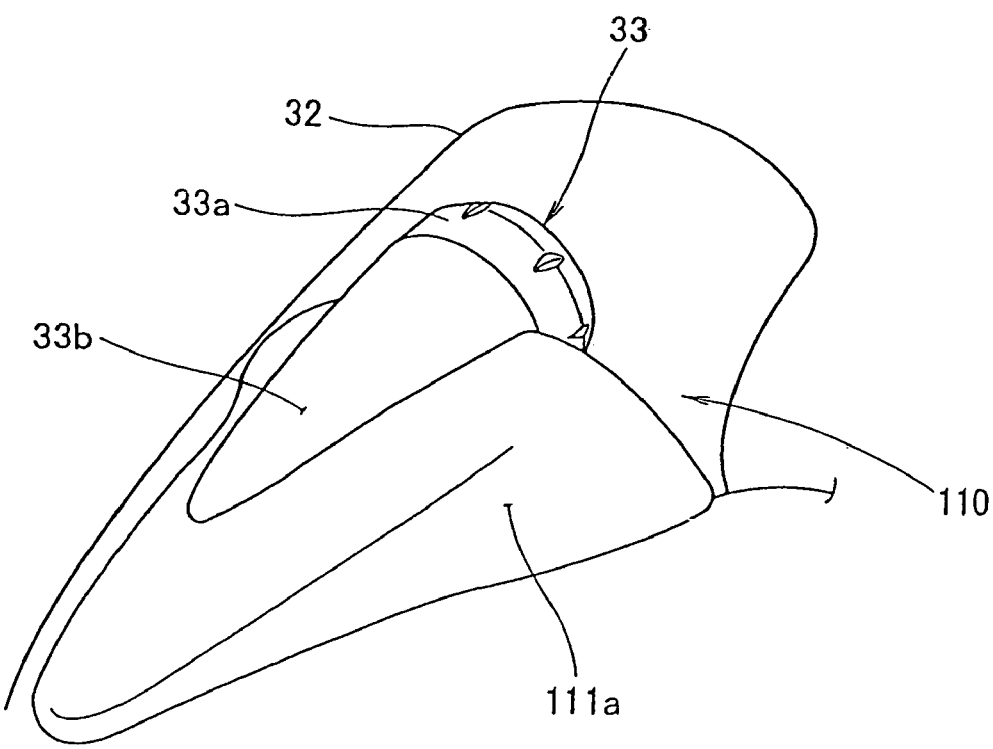
FIG. 12 is a second perspective view showing the display device of the two-wheeled vehicle in FIG. 1.

FIG. 12 is a second perspective view showing the display device of the two-wheeled vehicle including the headlamp according to the embodiment of the present invention, showing that the display device 110 is disposed inside a wind screen 32, a peripheral wall 33a of the meter 33 is extended toward the front of the vehicle to form a meter extension wall 33b being substantially triangular, which is elongated in the fore-and-aft direction, and the meter extension wall 33b is protruded upwardly from a front cover 111a of the display unit 11 (See FIG. 11).

By providing the meter extension wall 33b elongated in the fore-and-aft direction so as to protrude from the front cover 111a, the display device 110 may be formed into a streamline shape, thereby giving a speedy impression.

Figure 13:
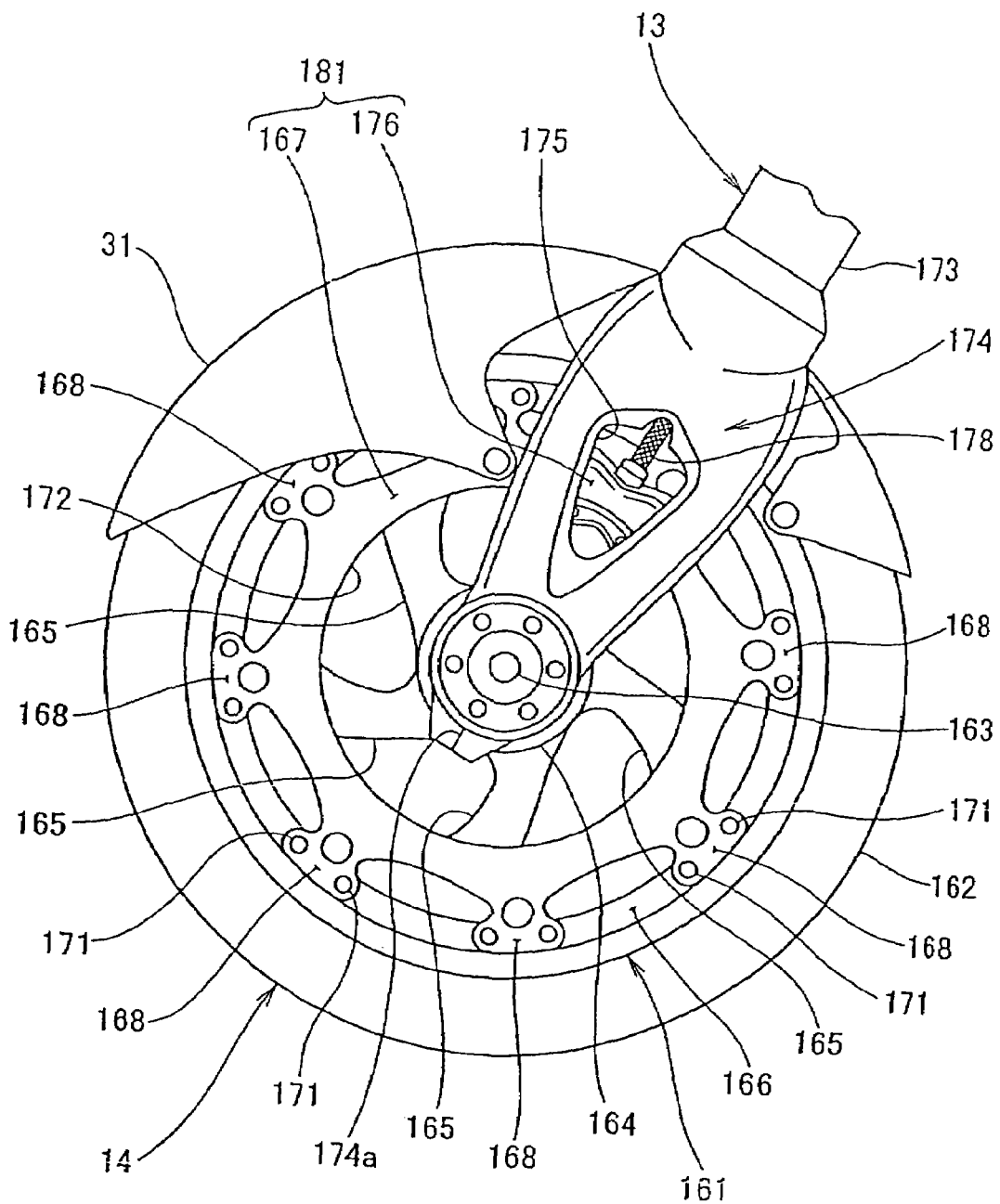
FIG. 13 is a side view showing a front wheel and a front suspension of the two-wheeled vehicle in FIG. 1.

FIG. 13 is a side view showing a front wheel and a front suspension of the two-wheeled vehicle including the headlamp according to the embodiment of the present invention. The front wheel 14 includes a casting wheel 161, and a tire 162 mounted to the wheel 161.

The wheel 161 is a member including a hub 164 rotatably attached to an axle 163, spokes 165 extending radially outwardly from the hub 164, and an annular rim 166 connected to the distal ends of the spokes 165 formed integrally with each other, and the outer periphery of an annular brake disk 167, more specifically, outer peripheral projections 168 are attached to the side of the rim 166 with bolts 171. Reference numeral 172 designates the inner peripheral portion of the brake disk 167.

The front suspension 13 includes a cylindrical shock absorber 173, and a wheel supporting member 174 attached to the lower part of the shock absorber 173, and the front wheel 14 is rotatably mounted to the axle 163, which is attached to the wheel supporting member 174, via the bearing.

The wheel supporting member 174 includes an opening 175 opening toward the side of the vehicle, and a brake caliper 176 is attached to the wheel supporting member 174 so as to cross over the opening 175. Reference numeral 174a designates an expanding slot formed at the lower end of the wheel supporting member 174 for attaching the axle 163, and reference numeral 178 designates a brake hose for supplying liquid pressure in the cylinder provided in the brake caliper 176.

The brake disk 167 and the brake caliper 176 described above are components constituting a front wheel disk brake device 181, and the front wheel disk brake device 181 has a structure in which the brake caliper 176 is inserted into the brake disk 167 from the side of the inner peripheral portion 172 for clamping the brake caliper 176.

Figure 14:
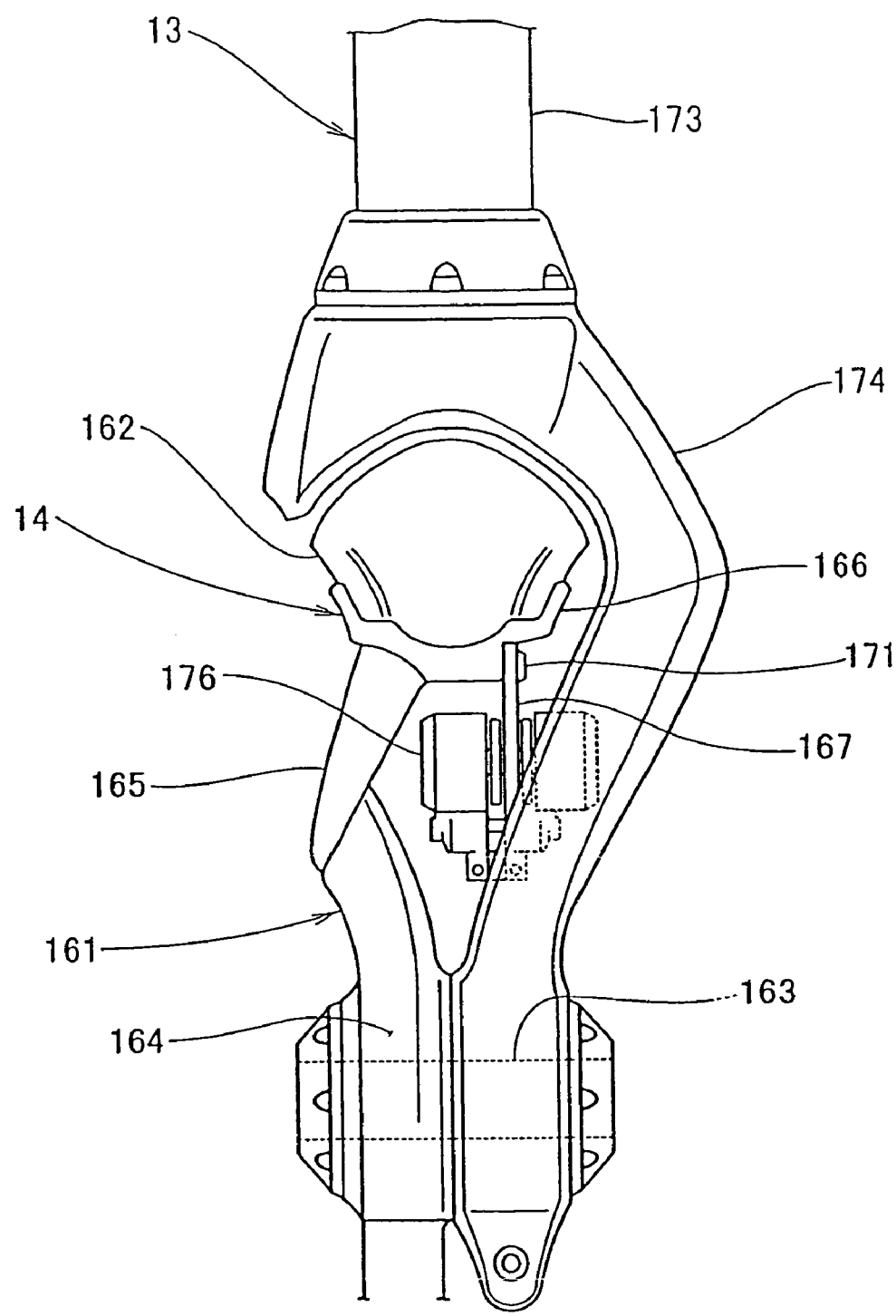
FIG. 14 is a front view showing the front wheel and the front suspension of the two-wheeled vehicle in FIG. 1.

FIG. 14 is a front view showing the front wheel and the front suspension of the two-wheeled vehicle including the headlamp according to the embodiment of the present invention, showing that the axle 163 is attached to the lower end of the wheel supporting member 174 formed into an angular C-shape, and the front wheel 14 is supported by the cantilevered axle 163.

The spokes 165 of the wheel 161 are portions formed by twisting the center portions thereof. By forming the spokes 165 into the twisted shape, the wheel 161 is given an ascetically pleasing design, thereby improving the commercial property.

Figure 15:
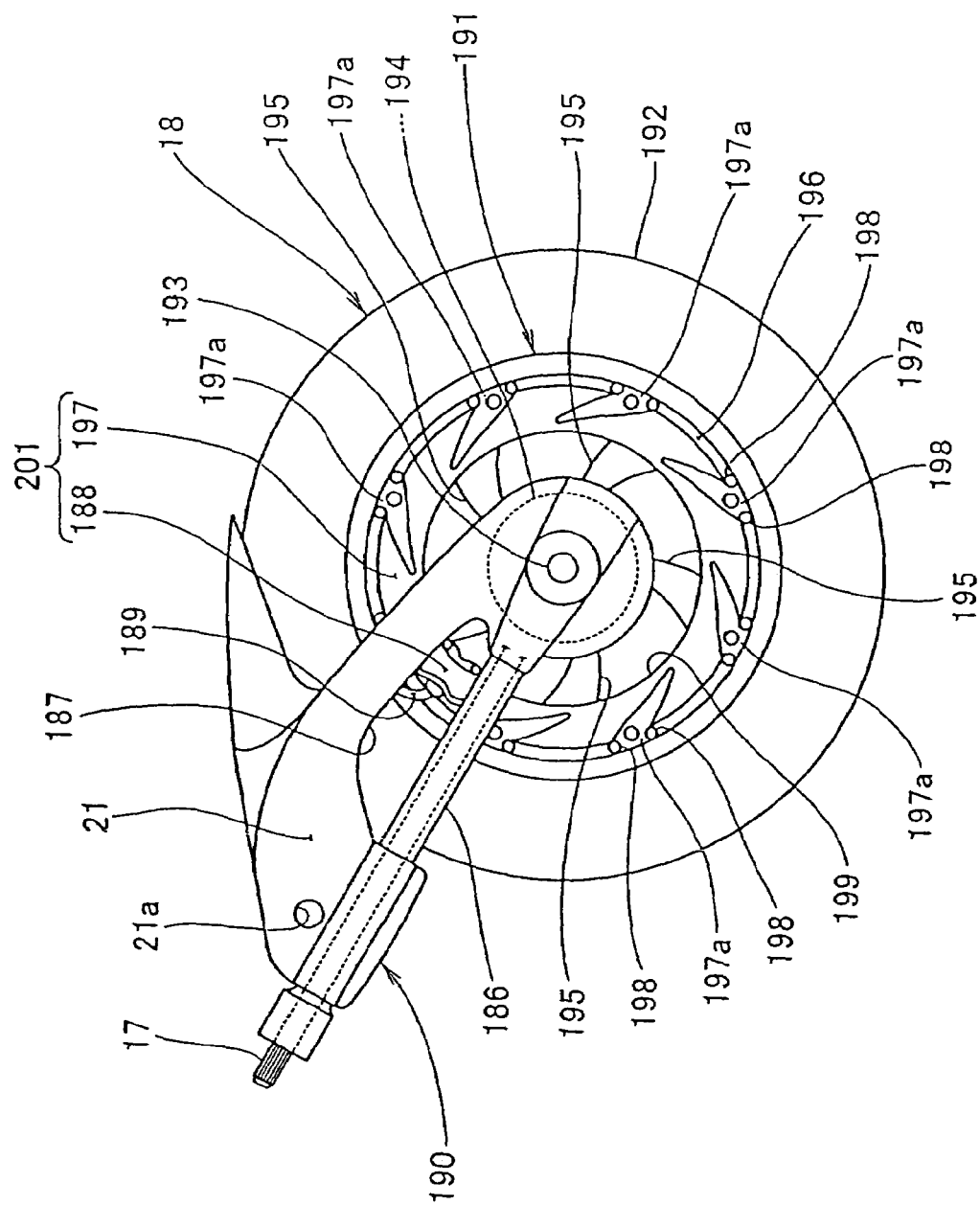
FIG. 15 is side view showing a rear wheel and a swing arm of the two-wheeled vehicle in FIG. 1.

FIG. 15 is a side view showing the rear wheel and the swing arm of the two-wheeled vehicle including the headlamp according to the embodiment of the present invention, wherein a drive shaft 17, which is used for connecting the transmission (not shown) and the rear wheel 18 and for driving the rear wheel 18, is stored in a shaft case 186. The shaft case 186 is attached to the swing arm 21, and a brake caliper 188 is attached to the swing arm 21 and the shaft case 186 so as to extend across an opening 187, which opens toward the side of the vehicle defined by the swing arm 21 and the shaft case 186. Reference numeral 21a designates a mounting hole for mounting the swing arm 21 to a pivot shaft provided on the monocoque frame 11 (see FIG. 1), reference numeral 189 designates a brake hose for supplying liquid pressure into the cylinder provided on the brake caliper 188.

The aforementioned swing arm 21 and the shaft case 186 are members for constituting an arm assembly 190.

The rear wheel 18 includes a cast wheel 191, and a tire 192 mounted to the wheel 191.

The wheel 191 includes a hub 194 rotatably mounted to an axle 193, spokes 195 extending radially outwardly from the hub 194, an annular rim 196 is connected to the distal ends of the spokes 195 and formed integrally with respect to each other, and the outer periphery 197a of an annular brake disk 197 is attached to the rim 196 with bolts 198. Reference numeral 199 designates the inner periphery of the brake disk 197.

The aforementioned brake caliper 188 and the brake disk 197 are components constituting the rear wheel disk brake device 201, and the rear wheel disk brake device 201 is configured in such a manner that the brake caliper 188 is inserted into the brake disk 197 from the side of an inner periphery 199 for clamping.

Figure 16A:
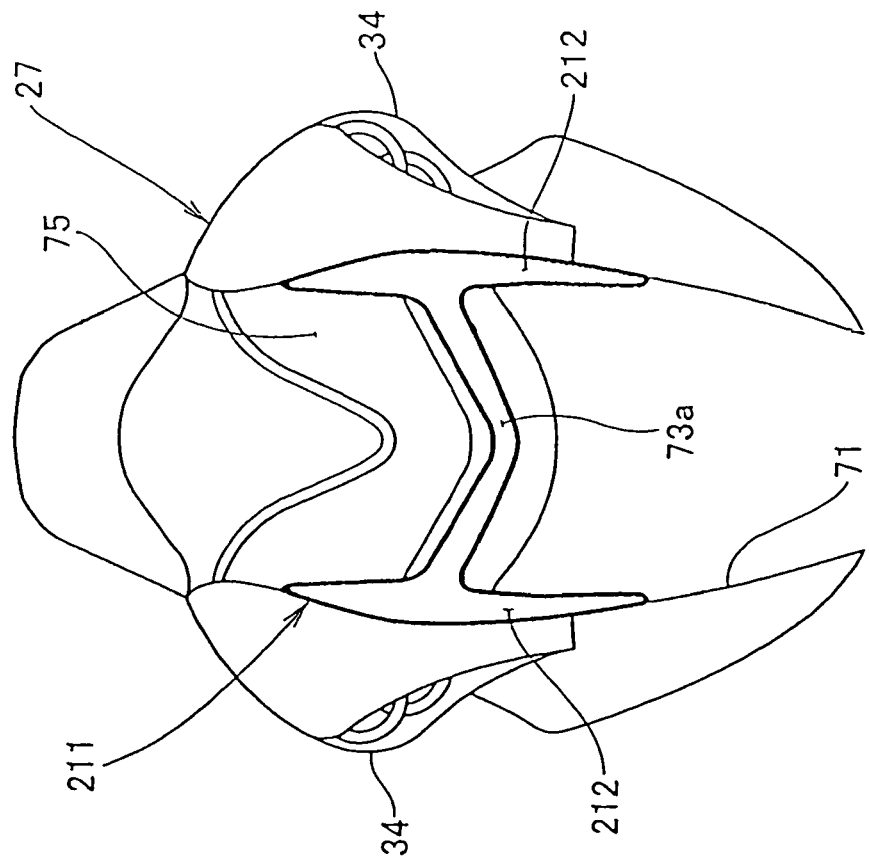
FIGS. 16(a) and 16(b) are front views showing other embodiments of a headlamp of the two-wheeled vehicle according to the present invention.

FIGS. 16(a) and (b) are front views showing two other embodiments of the headlamp of the two-wheeled vehicle according to the present invention. The same structures as in the embodiment shown in FIG. 3 are designated by the same reference numerals, and detailed description will be omitted.

In FIG. 16(a), a headlamp 205 is a substantially U-shaped member including a portion 73a elongated in the lateral direction, and portions 206 extending in an upward vertical direction from both the left and right ends of the lateral portion 73a. As seen in FIG. 16(a), the vertically extending portions 206 extend in a vertical direction to an extent which is greater than a vertical dimension of the lateral portion 73a. Again, the laterally extending portion 73a functions to emit a low beam, and the vertical portions 206 function to emit high beams.

Figure 16B:
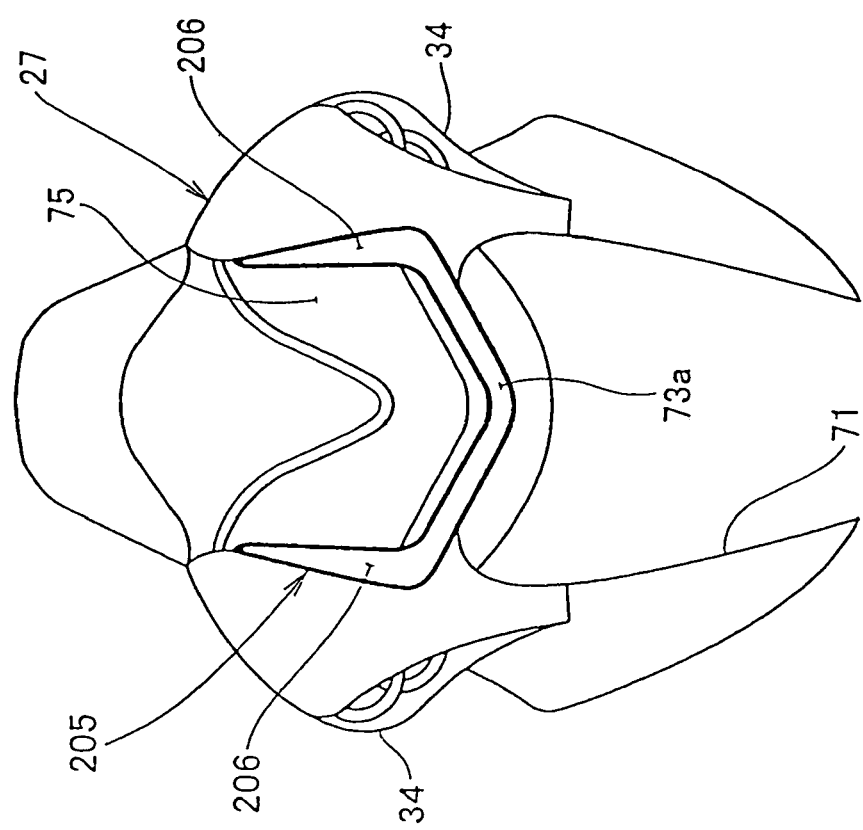
Figure 17:
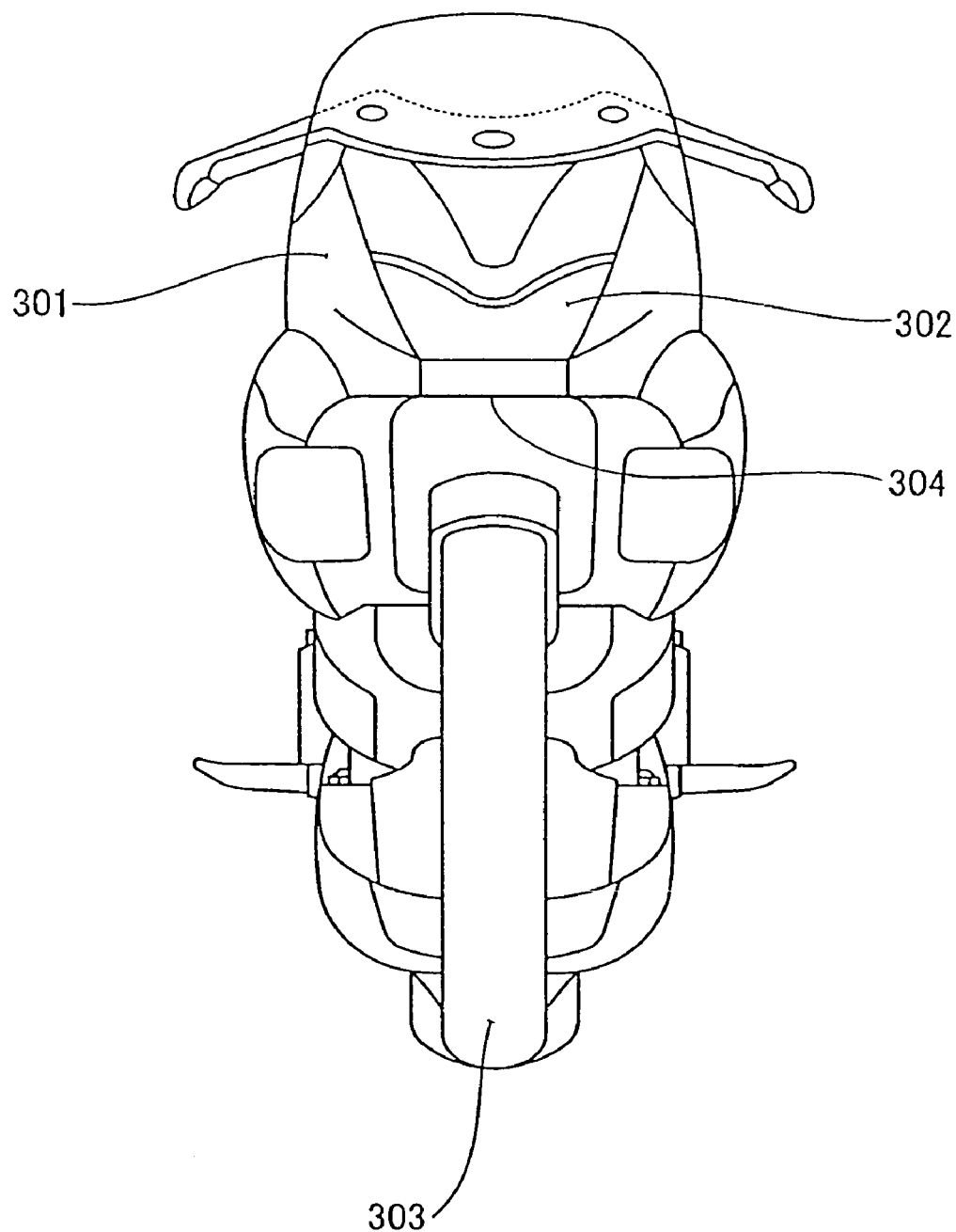
FIG. 17 is a front view showing a headlamp of a two-wheeled vehicle in the related art.

In FIG. 16(b), the headlamp 211 is a substantially H-shaped member including the lateral portion 73a, and portions 212 extending in both an upward and downward vertical direction from both the left and right ends of the lateral portion 73a. As in FIG. 16(a), the vertically extending portions 212 extend in a vertical direction to an extent which is greater than a vertical dimension of the lateral portion 73a. In addition, the lateral portion 73a is allocated for emitting a low beam, and the vertical portions 212 are allocated for emitting a high beam.

As described in conjunction with FIG. 1 and FIG. 3 above, the present invention provides a two-wheeled vehicle 10 including a leg shield 27 provided at a front of a vehicle, and a headlamp 73 is mounted to the leg shield 27, wherein the headlamp 73 includes a portion 73a elongated in the lateral direction and portions 73b elongated in a vertical direction extending from both ends of the lateral portion 73a.

Since the headlamp 73 includes a lateral portion 73a and vertical portions 73b elongated in a downward direction from the both ends of the lateral portion 73a, light may be emitted from the lateral portion 73a and the two portions 73b, hence improving the visibility of the headlamp 73 to other vehicles and to pedestrians, especially during the daytime.

Further, as shown in FIG. 16(b), the headlamp 73 of the present invention may be formed into an H-shape by extending the vertical portions 212 in both an upward and a downward direction from both ends of the lateral portion 73a. This H-shape design for the headlamp 73 can give a novel impression to the two-wheeled vehicle 10, whereby the commercial property of the two-wheeled vehicle 10 (see FIG. 1) can be improved.

Additionally, in the present invention the leg shield 27 may be formed into an angular C-shape in side view, wherein the front surface above the angular C-shaped bent section 27a of the leg shield 27 is formed by an upper inclined section 27b, with the laterally extending portion 73a of the headlamp disposed on the upper inclined section 27b, the lateral portion 73a being allocated for emitting a low beam, and the vertical portions 73b being allocated for emitting high beams.

Since the leg shield 27 is formed into an angular C-shape in side view, the lateral portion 73b is disposed on the upper inclined section 27b which constitutes the leg shield 27 which is of angular C-shape. Since the lateral portion 73a is allocated for emitting a low beam, and the vertical portions 73b are allocated for emitting high beams, the irradiating property from the lateral portion 73a located on top of the leg shield 27 can be improved, whereby the road surface can be illuminated more brightly.

In the present invention, the front surface of the leg shield 27 below the angular C-shaped bent section 27a may be formed by the lower inclined section 27c, and the vertical portions 73b may be extended from the upper inclined section 27b to the lower inclined section 27c.

Since the vertical portions 73b are elongated from the upper inclined section 27b above the angular C-shaped bent section 27a to the lower inclined section 27c below the bent section 27a, light beam(s) can be irradiated in different directions, such as from the vertical portions 73b extending upward and downward, whereby the irradiating property of the headlamp 73 is improved.

Further, in the present invention the headlamp 73 may be formed along the edge of the air intake port 71 provided at the front of the leg shield 27.

Since the head lamp 73 is formed along the edge of the air intake port 71 provided at the front of the leg shield 27, the shape or the size of the air intake port 71 is hardly limited when compared to the case in which a round or rectangular headlamp, as in the background art, is disposed at the front of the vehicle. The design of the present invention allows for the area of the air intake port 71 to be increased, and hence cooling capability of the engine 16 is improved.

Also, in the present invention the headlamp 73 may be formed of one or more LEDs, and may be formed into an M-shape, U-shape or H-shape in front view.

Since the headlamp 73 is formed of the LED(s), the power consumption of the headlamp 73 can be reduced. In addition, by employing the M-shaped, U-shaped or H-shaped headlamp 73, it can give a novel impression to the appearance of the two-wheeled vehicle, whereby the commercial property of the two-wheeled vehicle 10 can be improved.

Although there have been described what are the present embodiments of the invention, it will be understood that variations and modifications may be made thereto without departing from the spirit or essence of the invention, and it is intended that all such variations and modifications are encompassed by the scope of the appended claims. For example, in the embodiments described above, the headlamp includes a portion elongated in a lateral direction and portions elongated in a vertical direction from the ends of the lateral portion, but the invention is not limited thereto, e.g., the headlamp may be configured only of the lateral portion or only of the vertical portion(s). Also, the lateral portion in the present embodiment may be formed into a V-shape but, a linear shape, an inverted V-shape, or an arcuate as well.

I claim:

1. A two-wheeled vehicle comprising: a vehicle body cover at the front of the vehicle and a headlamp mounted to the vehicle body cover,
    wherein the headlamp comprises:
    a laterally elongated portion elongated in a lateral direction of the vehicle, and vertically extending portions extending in a vertical direction from both left and right ends of the laterally elongated portion to an extent which is greater than a vertical dimension of the laterally elongated portion,
    wherein said vehicle body cover is formed into an angular C-shape in side view, a front surface of the vehicle body cover above a bent portion of the angular C-shape is formed by an upper inclined section, the laterally elongated portion of the headlamp is arranged on the upper inclined section of the vehicle body cover, the laterally elongated portion of the headlamp is allocated for emitting a low beam, and the vertically extending portions of the headlamp are allocated for emitting high beams, and
    wherein the front surface of the vehicle body cover below the bent section of the angular C-shape is formed by a lower inclined section, and downwardly extending vertical portions of the headlamp are extended from the upper inclined section to the lower inclined section.

2. A headlamp for a two-wheeled vehicle according to claim 1, wherein the headlamp further comprises portions extending both in an upward and downward vertical direction from both the ends of the lateral portion, such that said headlamp is substantially H-shaped in front view.

3. A headlamp for a two-wheeled vehicle according to claim 2, wherein the headlamp is formed along an edge of an opening provided on a front portion of the vehicle body cover.

4. A headlamp for a two-wheeled vehicle according to claim 1, wherein the headlamp is formed along an edge of an opening provided on a front portion of the vehicle body cover.

5. A headlamp for a two wheeler according to claim 1, wherein the headlamp comprises at least one light emitting diode, and is formed into one of an M-shape, U-shape or H-shape in front view.

6. A two-wheeled vehicle comprising: a vehicle body cover at the front of the vehicle and a headlamp mounted to the vehicle body cover,
    wherein the headlamp comprises:
    a laterally elongated portion elongated in a lateral direction of the vehicle, and vertically extending portions extending in a vertical direction from both left and right ends of the laterally elongated portion to an extent which is greater than a vertical dimension of the laterally elongated portion,
    wherein the headlamp further comprises portions extending both in an upward and downward vertical direction from both the ends of the lateral portion, such that said headlamp is substantially H-shaped in front view,
    wherein the vehicle body cover is formed into an angular C-shape in side view, a front surface of the vehicle body cover above a bent portion of the angular C-shape is formed by an upper inclined section, the lateral portion of the headlamp is arranged on the upper inclined section of the vehicle body cover, the laterally elongated portion of the headlamp is allocated for emitting a low beam, and the vertically extending portions of the headlamp are allocated for emitting high beams, and
    wherein the front surface of the vehicle body cover below the bent section of the angular C-shape is formed by a lower inclined section, and downwardly extending vertical portions of the headlamp are extended from the upper inclined section to the lower inclined section.

7. A headlamp for a two-wheeled vehicle according to claim 6, wherein the headlamp is formed along an edge of an opening provided on a front portion of the vehicle body cover.

* * * * *